(12) United States Patent
Pintz et al.

(10) Patent No.: US 6,235,317 B1
(45) Date of Patent: May 22, 2001

(54) ADDITIVE FOR STIMULANTS

(76) Inventors: György Pintz; Kinga Paczolay, both of PF 590, H-1539 Budapest (HU)

( * ) Notice: Subject to any disclaimer, the term of this patent is extended or adjusted under 35 U.S.C. 154(b) by 0 days.

(21) Appl. No.: 09/338,929

(22) Filed: Jun. 16, 1999

Related U.S. Application Data

(63) Continuation of application No. PCT/HU96/00083, filed on Dec. 27, 1996, now abandoned.

(51) Int. Cl.[7] .......................... A61K 35/78; A61K 33/14; A61K 31/51; A23F 5/00
(52) U.S. Cl. .......................... 424/764; 424/756; 424/773; 424/725; 424/678; 424/679; 424/680; 424/681; 424/677; 424/696; 424/697; 514/276; 514/46; 426/594; 426/595; 426/596
(58) Field of Search .................................. 424/195.1, 678, 424/679, 680, 681, 677, 696, 697, 756, 764, 773, 725; 514/276, 46; 426/594, 595, 596

(56) References Cited

U.S. PATENT DOCUMENTS 4,188,409 * 2/1980 Kay .
5,518,743 * 5/1996 Pergola et al. .

FOREIGN PATENT DOCUMENTS

WO 95/17826 * 7/1995 (WO) .

OTHER PUBLICATIONS

English abstact of Japanese Pat. No. 63088126 A, 1988.*

* cited by examiner

*Primary Examiner*—Francisco Prats
*Assistant Examiner*—Susan D. Coe
(74) *Attorney, Agent, or Firm*—Burns, Doane, Swecker & Mathis, L.L.P.

(57) ABSTRACT

An additive for stimulants, useful in particular to reduce the health-damaging effects of coffee beverages, contains one or several vitamins, dandelion root extract, and, if required, one or several mineral salts. The additive characterized in that it contains anise extract and adenosine.

10 Claims, No Drawings

ADDITIVE FOR STIMULANTS

This is a continuation of PCT/HU96/00083, filed Dec. 27, 1996, now abandoned.

Subject of the invention is an additive for stimulants, useful in particular to reduce the health-damaging effects of coffee beverages. Since many centuries coffee has been one of the most popular enjoyable consumer's goods. Owing to its caffeine content coffee has a stimulatory effect. But besides its agreeable properties coffee has also some disadvantages. It disturbs the acid-base balance of the organism, stimulates the stomach. Caffeine has also some toxic effect. It increases the risk of myocardial infarction (American Journal of Epidemiology, 1988/9, 570–8, Rosenberg et al.), reduces the effectiveness of the immunity (International Journal of Immunopharmacology 1990/1, 129–34, Melamed et al.), may induce mutation of genes (Food-Chemical-Toxicology 1989/4, 22714 32, Aeschbacher et al.), increases the risk of generating several cancer diseases. Moderate consumers of coffee are, naturally, less exposed to the above dangers.

A substitution of the coffee by some other beverages is—because of its high enjoyable and stimulatory effect—hardly to be expected. Therefore, any endeavor aiming at diminishing the harmful effects of coffee shall be welcomed. Such an effort was also the development of decaffeinated coffee. Raw natural coffee after having been cleaned by the Wimmer-Roselius procedure is treated by steam and afterwards extracted and roasted. A disadvantage of decaffeinated coffee is that, because of its lack of stimulating effects, many people don't like it.

Many procedures are known to extract, by means of solvents, certain substances from the coffee, at the same time retaining its caffeine content. Such procedures are the subject of the publications DE-OS 16 92 284, DE-OS 19 60 694, DE-OS 20 31 830, DE-OS 26 18 545, DE-PS 27 20 204, CH-PS 568 719. All these procedures have the disadvantage that they more or less alter the aroma of the coffee, as the extraction cannot be carried out with the necessary selectivity.

Patent document GB 2 895 968 presents a composition to aromatize tea with which an emulsion is being made from the essential oil phase responsible for the aroma, and afterwards pulverized. The disadvantage of this solution is that the product has no health protecting effect and that it is not suitable to make additives soluble in the coffee and containing only liquid phases. Patent document FR 2 648 679 presents a natural pulverized product containing vitamins, made of unroasted coffee and dried corn and fruit. From this product beverages or cakes can be made. The disadvantage of this product is that it cannot be added to the coffee prepared in a traditional way because it contents water insoluble particle. It is also unfavorable that it alters the accustomed taste and aroma of the coffee.

Patent document FR 2 662 585 presents a powder blend serving for the preparing of Turkish coffee, containing finely ground coffee and sweetener. The disadvantage of the blend is its lack of health protecting effect and that there are water insoluble particles in it. Subject of the publication DE-OS 26 12 782 and U.S. Pat. No. 4,076,856 is the pyridine antagonists for methylxanthine to reduce its stimulatory effect in food. The disadvantage of this solution is that consumers of natural coffee drink it just for the sake of its stimulatory effect. Therefore suppression of this effect alone is not desirable in the case of coffee.

Patent document JP 61 166 379 describes a healthy acknowledged food product which is usually consumed in the shape of tablets. The product contains an extract of dandelion roots with vitamins, chlorophyll and mineral salts. A disadvantage of the product is that it contains also water-insoluble particles and that it has no stimulatory effect.

Patent document JP 59 125 844 presents a coffee with which dandelion roots extract, as well as Japanese and Chinese medical herbs are added to the decaffeinated roasted instant coffee. The beverage thus prepared is free from the detrimental effects of the coffee just as any decaffeinated coffee. Its disadvantage is the lack of the stimulatory effect of caffeine and that during the process of roasting arise harmful substances.

In the case of patent document JP 3 247 239 dandelion root extract is being added to the roasted finely ground coffee deficient in caffeine. The disadvantage of this solution is the same as with the previous solutions.

The aim of the publication WO 95/17826 is to achieve a complex reduction of the detrimental effects of the consumption of coffee. A disadvantage of this solution is that according to our experiments long-lasting use of the product can cause unfavorable side effects and that from the cardiological point of view it was ineffective.

Purpose of the invention is to eliminate the disadvantage of the solutions known up to now and to develop such a coffee additive, which reduces the harmful effects of the coffee in a natural way and at the same time leaves the accustomed taste of coffee unchanged.

Base of the idea being subject of the invention is the cognition that if to the prepared coffee a herb extract is added which diminishes the acidic content and increases the detoxicating ability of the liver one gets a more favorable effect than hitherto.

According to the purpose of the invention its subject is an additive for stimulants, useful in particular to reduce the health-damaging effects of coffee beverages, containing one or several vitamins, dandelion root extract, and if required one or several mineral salts, prepared in a way as to contain an extract of anise.

Another characteristic feature of the additive is the content of adenosine. The compound contains an extract of cardamom seeds. The vitamins contain a mixture of the vitamins B, $B_6$ and/or nicotinamide.

The additive covered by the invention contains numerous advantages. It reduces the toxic and acidic effects of the coffee. It further improves digestion in the stomach, the ability to absorb vitamins and mineral salts and the detoxicating function of the liver. Vitamins which are mostly relieved from the body during the consumption of coffee are being replaced.

Further on we present the additive being subject of the invention on the base of several examples of realization. As a rule the additive contains the following effective substances:

A/ Anise-extract (*Anisi fructus*) which is made by pulverizing, drenching and evaporating the seeds of anise. The extract is made in the same way as the extract of dandelion root. The obtained extract contains about 2 vol. % of drug.

B/ Extract of dandelion roots (*Taraxaci radix*). This extract is made by pulverization, drenching and evaporation of the roots. The dry root is being pulverized, drenched in water at a temperature 90° C. (194° F.) during one hour, than filtered and evaporated. The achieved extract contains 10 vol. % of drug.

C/ Adenosine, which, according to our observation, antagonizes caffeine.

D/ Extract of Cardamom seeds (*Elettaria cardamomum*), which is made by pulverizing, drenching and evaporating the seeds of cardamom. The extract is made in the same way as the extract of dandelion root. The obtained extract contains about 2 vol. % of drug.

E/ A mixture of mineral salts containing advantageously natriumdihydrogen phosphoricum and first and foremost those mineral salts which are missing in the coffee prepared by distilling, reduces the toxic effect of coffee. An advisable compound of the mixture of mineral salts related to the total content of mineral salts is as follows: 20 vol. % of magnesium salt, e.g. magnesium sulfate, 29 vol. % of calcium lactate or calcium salt, 50 vol. % of sodium dihydrogen phosphate and 1 vol. % of potassium salt, e.g. potassium chloride.

F/ Vitamins first and foremost those belonging to the B-vitamin complex which as a consequence of the consumption of coffee are relieved from the body. An advisable compound of the mixture of vitamins related to the their total mass is the following: 10 vol. % of vitamin $B_1$, 5 vol. % of vitamin $B_2$, 10 vol. % of vitamin $B_6$, 75 vol. % of nicotinamide.

Besides the above effective substances the product covered by the invention may contain also further substances like carrier substances, cream, sugar, sorbite, sweetener, milk, powdered milk, cocoa, coffee creamer (non-diary), lactalbumins, fats, emulgator, stabilizer, carbohydrates, aromatic substances, dyestuff, other vitamins, trace elements, drugs, mineral salts etc. During the manufacturing process the components of the additive are processed in pulverized form in the above described way and in a proportion according to example No. 1 they are homogenized by stirring during 20 minutes. After the homogenization the additive is being finished in the shape of powder. The additive can be prepared not only in the shape of powder, but also in the form of tablets, effervescent tablets, liquid etc. In the following we make you acquainted with the compound of an example. The indicated quantities are related to one portion (50–150 ml) of coffee, containing 6–7 g roasted and ground coffee beans.

| [Mg] | Example 1 |
| --- | --- |
| A/Anise extract | 9.0 |
| B/Dandelion extract | 8.0 |
| C/Adenosine | 2.0 |
| D/Cardamom-seeds extract | 4.0 |
| E/Mixture of mineral salts | 4.0 |
| F/Vitamins | 8.0 |
| G/Carrier substance | 2465.0 |
|  | 2500.0 |

The additive according to example 1 slightly influences the taste of the coffee but at the same time it has a health protecting effect. The results of the clinical tests were favorable. The majority of the tested persons definitely felt better especially in regard to heartburn, mental activity, tiredness, digestion and general condition. With persons inclined to sweating after the consumption of the coffee with the additive sweating was moderated. None of the tested persons perceived detrimental effects.

Clinical cardiological tests were also carried out with the product and checked by a check group. The product considerably moderated the raise of blood pressure and the pulse caused by the coffee. The effect exercised on the general condition by the coffee consumed with the product was by 80% more favorable than in the case when coffee was consumed without the additive.

The coffee additive being subject of the invention can be used for the reduction of the harmful effects of caffeine containing coffee.

What is claimed by the inventors:

1. Additive for stimulants comprising at least one vitamin, dandelion root water-soluble extract, and a compound comprising a water-soluble extract of anise, and, optionally, at least one mineral salt.

2. Additive according to claim 1, further comprising adenosine.

3. Additive according to claim 1, further comprising a compound comprising an extract of cardamom seeds.

4. Additive according to claim 1, wherein the vitamin comprises one or more of $B_1$, $B_2$, $B_6$ and nicotinamide.

5. Additive according to claim 2, wherein the compound comprises an extract of cardamom seeds.

6. Additive according to claim 2, wherein the vitamin comprises one or more of $B_1$, $B_2$, $B_6$ and nicotinamide.

7. Additive according to claim 3, wherein the vitamin comprises one or more of $B_1$, $B_2$, $B_6$ and nicotinamide.

8. Additive according to claim 1, wherein the at least one mineral salt is magnesium sulfate, calcium lactate, potassium salt or sodium dihydrogen phosphate.

9. The additive according to claim 1, wherein the stimulant is coffee.

10. A method of replacing vitamins relieved during the consumption of a stimulant, comprising adding the additive of claim 1 to the stimulant before consumption of the stimulant.

* * * * *